United States Patent
Svec (10) Patent No.: US 11,855,580 B2
(45) Date of Patent: Dec. 26, 2023

(54) INTERLOCKING STRUCTURAL ROOFING PANELS WITH INTEGRATED SOLAR PANELS

(71) Applicant: BMIC, LLC, Dallas, TX (US)

(72) Inventor: James A. Svec, Kearny, NJ (US)

(73) Assignee: BMIC LLC, Dallas, TX (US)

(*) Notice: Subject to any disclaimer, the term of this patent is extended or adjusted under 35 U.S.C. 154(b) by 0 days.

(21) Appl. No.: 17/520,984

(22) Filed: Nov. 8, 2021

(65) Prior Publication Data
US 2022/0149771 A1    May 12, 2022

Related U.S. Application Data

(60) Provisional application No. 63/111,301, filed on Nov. 9, 2020.

(51) Int. Cl.
*H02S 20/25*    (2014.01)

(52) U.S. Cl.
CPC .................... *H02S 20/25* (2014.12)

(58) Field of Classification Search
CPC .......... H02S 20/25; H02S 20/23; H02S 40/45; E04D 3/352; E04D 3/358
See application file for complete search history.

(56) References Cited

U.S. PATENT DOCUMENTS

| | | |
|---|---|---|
| 550,325 A | 11/1895 | Kinnear |
| 1,329,794 A | 2/1920 | Moomaw |
| 1,539,632 A | 5/1925 | Belding |
| 1,743,206 A | 1/1930 | Fulenwider et al. |
| 2,042,890 A | 6/1936 | Fulenwider et al. |
| 2,766,861 A | 10/1956 | Abramson |
| 3,325,952 A | 6/1967 | Trachtenberg |

(Continued)

FOREIGN PATENT DOCUMENTS

| | | |
|---|---|---|
| CA | 2526602 C | 10/2013 |
| EP | 2597398 A2 | 5/2013 |

(Continued)

OTHER PUBLICATIONS amazon.com; USP Structural Connectors #TPP36 3x6 Pronged Truss Plate; https://www.amazon.com/USP-STRUCTURAL-CONNECTORS-TPP36-Pronged/dp/B0044ULCA4; available as of Aug. 18, 2016 / retrieved by the searching authority from the internet on Jun. 8, 2021.

*Primary Examiner* — Devina Pillay (74) *Attorney, Agent, or Firm* — WOMBLE BOND DICKINSON (US) LLP (57) ABSTRACT

A roofing system with interlocking structural panels that have an outer, exterior side surface adapted to be exposed to weather, and an inner side that faces the interior of a structure when installed. The roofing system generally can include a first plurality of structural panels and a second plurality of structural panels, with at least one of the pluralities of structural panels including roofing panels, and the other plurality of structural panels including photovoltaic modules or solar panels that can be mounted in series with the roofing panels to form the roof structure. The structural panels of the roofing system are configured to act as structural components for construction of a roof structure, and are further adapted and/or constructed to be easily handled and installed by individual installers.

17 Claims, 4 Drawing Sheets

(56) References Cited

U.S. PATENT DOCUMENTS

| | | |
|---|---|---|
| 3,347,001 A | 10/1967 | Cosden |
| 3,363,380 A | 1/1968 | Merrill |
| 3,412,517 A | 11/1968 | Ellis et al. |
| 3,468,086 A | 9/1969 | Warner |
| 3,848,383 A | 11/1974 | Wilson et al. |
| 3,899,855 A | 8/1975 | Gadsby |
| 4,079,561 A | 3/1978 | Vallee |
| 4,111,188 A | 9/1978 | Murphy, Jr. |
| 4,135,342 A | 6/1979 | Cotter |
| 4,163,351 A | 8/1979 | Ishikawa |
| 4,189,889 A | 2/1980 | Yanoh |
| 4,336,413 A | 6/1982 | Tourneux |
| 4,343,126 A | 8/1982 | Hoofe, III |
| 4,392,009 A | 7/1983 | Napoli |
| 4,445,305 A | 5/1984 | Orie, Sr. |
| 4,453,349 A | 6/1984 | Ryan |
| 4,469,731 A * | 9/1984 | Saracino ............ E04F 13/0864 428/137 |
| 4,499,700 A | 2/1985 | Gustafsson |
| 4,522,007 A | 6/1985 | Oehlert |
| 4,580,383 A | 4/1986 | Pittsman et al. |
| 4,582,953 A | 4/1986 | Nagase et al. |
| 4,592,183 A | 6/1986 | See |
| 4,683,697 A | 8/1987 | Gregg |
| 4,856,236 A | 8/1989 | Parker |
| 4,932,184 A | 6/1990 | Waller |
| 4,936,063 A | 6/1990 | Humphrey |
| 5,056,288 A | 10/1991 | Funaki |
| 5,074,093 A | 12/1991 | Meadows |
| 5,295,338 A | 3/1994 | Guffey et al. |
| 5,338,369 A | 8/1994 | Rawlings |
| 5,345,740 A | 9/1994 | Huang |
| 5,349,801 A | 9/1994 | Verbofsky |
| 5,409,549 A | 4/1995 | Mori |
| 5,465,543 A | 11/1995 | Seifert |
| 5,469,680 A | 11/1995 | Hunt |
| 5,535,567 A | 7/1996 | Cahoon |
| 5,598,677 A | 2/1997 | Rehm, III |
| 5,613,337 A | 3/1997 | Plath et al. |
| 5,636,481 A | 6/1997 | De Zen |
| 5,642,596 A | 7/1997 | Waddington |
| 5,651,837 A | 7/1997 | Ohtsuka et al. |
| 5,746,839 A | 5/1998 | Dinwoodie |
| 5,752,355 A | 5/1998 | Sahramaa |
| 5,768,844 A | 6/1998 | Grace, Sr. et al. |
| 5,881,501 A | 3/1999 | Guffey et al. |
| 5,951,785 A | 9/1999 | Uchihashi et al. |
| 6,065,256 A | 5/2000 | Joko et al. |
| 6,105,314 A | 8/2000 | Stocksieker |
| 6,111,189 A | 8/2000 | Garvison et al. |
| 6,170,215 B1 | 1/2001 | Nasi |
| 6,272,807 B1 | 8/2001 | Waldrop |
| 6,282,858 B1 | 9/2001 | Swick |
| 6,314,704 B1 | 11/2001 | Bryant |
| 6,370,828 B1 | 4/2002 | Genschorek |
| 6,465,724 B1 | 10/2002 | Garvison et al. |
| 6,521,821 B2 | 2/2003 | Makita |
| 6,581,348 B2 | 6/2003 | Hunter, Jr. |
| RE38,210 E | 8/2003 | Plath et al. |
| 6,606,823 B1 | 8/2003 | McDonough et al. |
| 6,647,687 B2 | 11/2003 | Kern |
| 6,772,569 B2 | 8/2004 | Bennett et al. |
| 6,907,701 B2 | 6/2005 | Smith |
| 6,914,182 B2 | 7/2005 | Takeda et al. |
| 7,178,295 B2 | 2/2007 | Dinwoodie |
| 7,246,474 B2 | 7/2007 | Dombek et al. |
| 7,328,534 B2 | 2/2008 | Dinwoodie |
| 7,342,171 B2 | 3/2008 | Khouri et al. |
| 7,413,790 B2 | 8/2008 | Hutter, III |
| 7,487,771 B1 | 2/2009 | Eiffert et al. |
| 7,513,084 B2 | 4/2009 | Arguelles |
| 7,607,271 B2 | 10/2009 | Griffin et al. |
| 7,721,506 B2 | 5/2010 | Bennett et al. |
| 7,739,848 B2 | 6/2010 | Trout |
| 7,748,191 B2 | 7/2010 | Podirsky |
| 7,811,663 B2 | 10/2010 | Paradis et al. |
| 7,900,407 B2 | 3/2011 | Plaisted |
| 8,074,417 B2 | 12/2011 | Trabue et al. |
| 8,104,239 B2 | 1/2012 | Fath |
| 8,171,689 B2 | 5/2012 | Pierson et al. |
| 8,215,071 B2 | 7/2012 | Lenox |
| 8,316,609 B2 | 11/2012 | Ben-Zvi |
| 8,371,076 B2 | 2/2013 | Jones et al. |
| 8,382,513 B2 | 2/2013 | Kobayashi |
| 8,476,523 B2 | 7/2013 | Bennett |
| 8,495,839 B2 | 7/2013 | Tsuzuki |
| 8,511,006 B2 | 8/2013 | Reisdorf et al. |
| 8,635,828 B2 | 1/2014 | Bahnmiller |
| 8,813,460 B2 | 8/2014 | Cinnamon et al. |
| 8,869,478 B2 | 10/2014 | Gianolio |
| 8,875,454 B2 | 11/2014 | Arguelles |
| 9,032,679 B2 | 5/2015 | Propst |
| 9,169,646 B2 | 10/2015 | Rodrigues |
| 9,181,704 B2 | 11/2015 | Rasmussen et al. |
| 9,273,885 B2 | 3/2016 | Rodrigues et al. |
| 9,291,225 B2 | 3/2016 | Arbesman et al. |
| D754,885 S | 4/2016 | Rasmussen et al. |
| D764,687 S | 8/2016 | Anderson et al. |
| 9,523,202 B2 | 12/2016 | Anderson et al. |
| 9,611,647 B2 | 4/2017 | Yang |
| 9,670,976 B2 | 6/2017 | Arbesman et al. |
| 9,689,164 B2 | 6/2017 | Rasmussen et al. |
| 9,876,132 B2 | 1/2018 | Morad et al. |
| 9,890,537 B2 | 2/2018 | Martin et al. |
| 9,970,197 B2 | 5/2018 | Maurer et al. |
| 10,027,274 B2 | 7/2018 | Van Giesen et al. |
| 10,115,859 B2 | 10/2018 | Rodrigues et al. |
| 10,187,005 B2 | 1/2019 | Rodrigues et al. |
| 10,196,821 B2 | 2/2019 | Anderson et al. |
| 10,256,765 B2 | 4/2019 | Rodrigues et al. |
| 10,294,669 B2 | 5/2019 | Prygon |
| 10,315,382 B2 | 6/2019 | Arbesman |
| 10,316,911 B2 | 6/2019 | Arbesman et al. |
| 10,335,847 B2 | 7/2019 | Arbesman et al. |
| 10,415,245 B2 | 9/2019 | Bennett et al. |
| 10,505,492 B2 | 12/2019 | Hudson et al. |
| 10,505,493 B2 | 12/2019 | Karkheck |
| 10,547,270 B2 | 1/2020 | Hudson et al. |
| 10,673,373 B2 | 6/2020 | Hudson et al. |
| 10,693,413 B2 | 6/2020 | Rodrigues |
| 10,749,460 B2 | 8/2020 | Guo |
| 10,917,033 B2 | 2/2021 | Rodrigues |
| 11,012,024 B2 | 5/2021 | Rodrigues et al. |
| 11,028,590 B1 | 6/2021 | Boss et al. |
| 11,414,865 B2 | 8/2022 | Sealock et al. |
| 2003/0010374 A1 | 1/2003 | Dinwoodie |
| 2004/0000334 A1 | 1/2004 | Ressler |
| 2004/0031518 A1 | 2/2004 | Plantfeber |
| 2004/0187909 A1 | 9/2004 | Sato et al. |
| 2004/0226247 A1* | 11/2004 | Byrd .................. E04D 3/358 52/518 |
| 2005/0076948 A1 | 4/2005 | Komamine |
| 2005/0144850 A1* | 7/2005 | Hageman ............ E04D 3/358 52/3 |
| 2005/0257453 A1 | 11/2005 | Cinnamon |
| 2006/0225780 A1 | 10/2006 | Johnson, III et al. |
| 2007/0137132 A1 | 6/2007 | Plowright |
| 2007/0181174 A1 | 8/2007 | Ressler |
| 2007/0199590 A1 | 8/2007 | Tanaka et al. |
| 2007/0295393 A1 | 12/2007 | Cinnamon |
| 2008/0155908 A1 | 7/2008 | Nomura et al. |
| 2008/0190047 A1 | 8/2008 | Allen |
| 2008/0302030 A1 | 12/2008 | Stancel et al. |
| 2008/0302407 A1 | 12/2008 | Kobayashi |
| 2008/0315061 A1 | 12/2008 | Fath |
| 2009/0137168 A1 | 5/2009 | Peng |
| 2010/0126561 A1 | 5/2010 | Reich |
| 2010/0170169 A1 | 7/2010 | Railkar et al. |
| 2010/0186334 A1 | 7/2010 | Seem |
| 2010/0235206 A1 | 9/2010 | Miller et al. |
| 2010/0236610 A1 | 9/2010 | Stancel et al. |
| 2010/0294345 A1 | 11/2010 | Leithold |
| 2010/0313499 A1 | 12/2010 | Gangemi |
| 2010/0313501 A1 | 12/2010 | Gangemi |

(56) References Cited

U.S. PATENT DOCUMENTS

| | | |
|---|---|---|
| 2011/0070765 A1 | 3/2011 | Kobayashi |
| 2011/0232715 A1 | 9/2011 | Lenox |
| 2011/0284058 A1 | 11/2011 | Cinnamon |
| 2011/0302859 A1 | 12/2011 | Crasnianski |
| 2012/0233940 A1 | 9/2012 | Perkins et al. |
| 2012/0240490 A1 | 9/2012 | Gangemi |
| 2012/0304559 A1 | 12/2012 | Ishida |
| 2013/0014455 A1 | 1/2013 | Grieco |
| 2013/0125482 A1 | 5/2013 | Kalkanoglu et al. |
| 2013/0186028 A1 | 7/2013 | Resso et al. |
| 2013/0318911 A1 | 12/2013 | Sealock et al. |
| 2014/0102519 A1 | 4/2014 | Rodrigues et al. |
| 2014/0166082 A1 | 6/2014 | Langmaid et al. |
| 2014/0190096 A1 | 7/2014 | Kacandes |
| 2014/0246078 A1* | 9/2014 | Carolan ............ H02S 20/00 136/251 |
| 2014/0290744 A1* | 10/2014 | Hood ............ H01L 31/049 156/305 |
| 2014/0305050 A1 | 10/2014 | Schulze et al. |
| 2015/0083197 A1 | 3/2015 | Langmaid et al. |
| 2015/0275518 A1 | 10/2015 | Flick |
| 2015/0354224 A1 | 12/2015 | Maurer et al. |
| 2015/0372635 A1 | 12/2015 | Praca et al. |
| 2016/0123013 A1 | 5/2016 | Rasmussen et al. |
| 2017/0237387 A1* | 8/2017 | Hudson ............ H02S 20/23 52/173.3 |
| 2021/0156150 A1 | 5/2021 | Boss et al. |
| 2021/0301534 A1 | 9/2021 | Svec et al. |
| 2022/0059713 A1* | 2/2022 | Selten ............ H01L 31/0481 |

FOREIGN PATENT DOCUMENTS

| | | |
|---|---|---|
| JP | 10046767 A | 2/1998 |
| JP | 2013171873 A | 9/2013 |
| WO | WO2012/120208 A2 | 9/2012 |
| WO | WO2012/136194 A2 | 10/2012 |
| WO | WO2013/099028 A1 | 7/2013 |
| WO | WO2020/159358 A1 | 8/2020 |
| WO | WO2021/202327 A1 | 10/2021 |

* cited by examiner

INTERLOCKING STRUCTURAL ROOFING PANELS WITH INTEGRATED SOLAR PANELS

REFERENCE TO RELATED APPLICATIONS

The present patent application claims benefit of U.S. Provisional Patent Application No. 63/111,301, filed Nov. 9, 2020.

INCORPORATION BY REFERENCE

U.S. Provisional Patent Application No. 63/111,301, filed Nov. 9, 2020, is specifically incorporation by reference herein as if set forth in its entirety.

TECHNICAL FIELD

This disclosure relates generally to roofing systems and in particular to roofing panels with solar panels integrated therein.

BACKGROUND

A need exists for roofing panels that are sufficiently structurally robust to be attached to widely spaced roof rafters and support their own weight. Such roofing panels should be lightweight so that they can be handled and installed by a small crew or even a single person, yet strong enough to support themselves when attached to widely spaced rafters. A further need exists for lightweight structural roofing panels that can include solar panels or modules with photovoltaic cells integrated therewith. It is to the provision of such structural roofing panels that the present disclosure is primarily directed.

SUMMARY

Briefly described, a roofing system is formed using interlocking structural panels that have an outer, exterior side surface adapted to be exposed to weather, and an interior side surface that faces towards the interior of a building when installed. The structural panels of the roofing system are configured to act as components for construction of a roof structure. The structural panels can be manufactured in varying sizes in accordance with the specification of a roof structure or installation in which the structural panels are to be used, and are further adapted and/or constructed to be easily handled and installed by individual installers. In some embodiments, the roofing system further generally will include a first plurality of structural panels and a second plurality of structural panels, with at least one of the pluralities of structural panels including roofing panels, and the other plurality of structural panels including photovoltaic modules or solar panels that can be mounted in series with the roofing panels to form the roof structure.

In one embodiment, the roofing panels will be formed with a lightweight core with at least one covering layer positioned over the core, and with a waterproofing layer over the at least one covering layer. The waterproofing layer generally will be positioned in an offset alignment, with one or more flanges or overlapping portions of the waterproofing layer defined along and projected past one or more sides of the roofing panel, and with one or more inset or recessed portions or areas defined along opposite sides of the roofing panels. The solar panels or photovoltaic modules also will include a core with at least one covering layer overlying the core and with a waterproofing layer positioned over the at least one covering layer, generally arranged in an offset alignment so as to form or define flanges or overlapping portions along one or more sides of the solar panels or photovoltaic modules, and inset or recessed areas or portions along opposite sides of the solar panels or photovoltaic modules.

The solar panels or photovoltaic modules further will include at least one photovoltaic cell received along an exterior facing surface of the waterproofing layer of each solar panel or photovoltaic module, with an inverter or micro-inverter coupled to the photovoltaic cell(s) and mounted below an upper surface of the core. For example, the inverter or micro-inverter can be received in a recess or opening formed in the core of their solar panel or photovoltaic module, with cables or other connectors extending from the inverter or micro-inverter and/or from the photovoltaic cell(s) through the core of the solar panel or photovoltaic module and to the interior facing surfaces of the core, enabling access thereto from within the structure, below the roof structure. An insulating layer further can be applied between the photovoltaic cell and the covering layer to insulate the photovoltaic cell.

In one embodiment, the at least one covering layer of each of the roofing panels and/or the solar panels or photovoltaic modules can include a sheet or panel of a finished wood, veneer or polymer material that will underlie the waterproofing layer, which can include a TPO or other waterproof covering material. In addition, the cores of the roofing panels and the solar panels or photovoltaic modules will be formed from a lightweight structural foam material, such as a polyisocyanurate (ISO), polystyrene, PVC, polyethylene, polyamide, a phenolic material, or other foam material providing sufficient rigidity and strength to the roofing panels and solar panels or photovoltaic modules as needed to form the roof structure, while enabling ease of handling and installation.

In other embodiments, the at least one covering layer can include a metal or polymer sheet adhered to at least the exterior facing surfaces of the cores. For example, the at least one covering layer could include a self-gripping sheet or layer that may be applied to one or more surfaces of the lightweight core material, without an intervening layer of wood, polymer or other materials. Still further, a polymer, wood or a metal sheet or layer could be applied to the interior facing surfaces of the cores, attached by adhesives or by mechanical engagement such as hooks or a press-fitting, to form a finished interior ceiling, or to facilitate hanging additional layers to form a ceiling after the roofing panels and solar panels are installed to form the roof structure.

The structural panels of the roofing system will be installed across a span between adjacent rafters of a roof structure. The flange portions of the waterproofing layers of the roofing panels and the solar panels or photovoltaic modules will be overlapped over corresponding recessed or inset areas or portions of adjacent roofing panels and/or solar panels or photovoltaic modules, and can be adhesively attached or connected. For example, in some embodiments, and adhesive can be applied to the flanges or inset areas before engagement therebetween, or the flange portions and/or inset portions can be provided with a peel-and-stick type adhesive having a removable covering that can be peeled away to expose the adhesive.

In some embodiments, the structural panels further can enable a reduction of a number of rafters of the roof structure; and in embodiments, can extend from an eave to a ridge at the roof. The flanged portions can also be heat welded or heat sealed; for example, where the weatherproofing layer includes a thermoplastic polyolefin (TPO) or other type of heat sealable polymer material.

In addition, fasteners will be applied along the seams between the adjacent structural panels to secure the panels to the rafters of the roof structure. In some embodiments, the overlapping portion(s) or flange(s) of the waterproofing layers of the adjacent, installed panels will overlap the fasteners inserted adjacent the edges of the panels, and can at least partially overlap with one of the overlapping portions or flanges extended over the other to cover and seal the seams between the adjacent installed structural panels and cover the fasteners. The roofing panels and solar or photovoltaic panels or modules are configured to interconnect or otherwise engage in a manner that provides ease of installation while also providing substantial structural integrity and strength to the panels so that the panels can support their own weight when spanned across and attached to widely spaced roof rafters.

Various aspects of a roofing system including structural panels incorporating solar or photovoltaic modules and methods forming structural panels for a roofing system incorporating solar or photovoltaic modules are provided by the present disclosure.

In one aspect, a roofing system is provided, comprising a first plurality of panels configured to inter-connect on a roof, and a second plurality of panels configured to inter-connect on the roof; wherein the first plurality of panels comprise roofing panels, each roofing panel including a core having side edges; and a waterproofing layer positioned over the core; wherein the waterproofing layer is positioned over in an offset alignment with respect to the core so as to define at least one inset portion along at least one side edge of the roofing panel and at least one flange portion projecting past another side edge of the roofing panel; and wherein the second plurality of panels comprise photovoltaic modules, each photovoltaic module including a core having; a waterproofing layer positioned over the core in an offset alignment with respect to the core so as to define at least one inset portion along at least one side edge of the photovoltaic module and at least one flange portion projecting past another side edge of the photovoltaic module; and a photovoltaic cell applied along an exterior facing surface of the waterproofing layer; wherein the roofing panels of the first plurality of panels and the photovoltaic modules of the second plurality of panels are located along a span between rafters of the roof, with the at least one flange portion of one of the waterproofing layers of each roofing panel or photovoltaic module overlapping a corresponding inset portion of an adjacent roofing panel or photovoltaic module.

In an embodiment, at least one of the roofing panels and the photovoltaic modules further comprises covering layer. In some embodiments, a wood or polymer material layer is mounted between the covering layer of at least one of the roofing panels or the photovoltaic modules and the cores thereof. In other embodiments, the covering layer comprises a metal sheet having a plurality of gripping features that are configured to penetrate and grip the core or the wood or polymer material.

In embodiments, at least one of the roofing panels and the photovoltaic modules further comprise at least one covering layer and wherein the covering layers comprise sheets of metal, wood or polymer materials adhesively fastened to the core. In some embodiments, the photovoltaic modules further comprise an insulating layer positioned between the photovoltaic cell and the covering layer.

In embodiments of the roofing system, the waterproofing layer comprises a polymer membrane having at least one overlapping edge portion configured to extend past at least one side edge of the core sufficient to cover an area of interconnection between adjacent photovoltaic modules. In some embodiments, the polymer membrane of the waterproofing layer comprises a thermoplastic polyolefin sheeting with an adhesive applied along a backing surface thereof.

In embodiments of the roofing system, the second plurality of panels further comprises a series of non-functional panels each having a configuration that substantially matches a configuration of the photovoltaic modules.

In embodiments, the core of each of the roofing panels and the photovoltaic modules comprises polyisocyanurate (ISO), polystyrene, PVC, polyethylene, polyamide, or a phenolic material.

In some embodiments of the roofing system, covering layers are arranged over first and second surfaces of the cores of the roofing panels and over exterior and interior facing surfaces of the cores of the photovoltaic modules so as to be diagonally offset in a first direction and a second direction, defining flange portions extending past a pair of adjacent side edges of the cores. In embodiments, the covering layers of the roofing panels and the photovoltaic modules further comprise metal sheets having a series of gripping features configured to engage and grip inset or recessed areas of the cores of the adjacent roofing panels or photovoltaic modules.

According to other aspects of the present disclosure, a method of forming a roof comprises installing a panel of one of a first and second plurality of panels in a position spanning a pair of spaced rafters; wherein the first plurality of panels includes roofing panels, each roofing panel comprising: a core having side edges; and a waterproofing layer positioned in an offset alignment with respect to the core so as to define at least one inset portion along at least one side edge of the roofing panel and at least one flange portion projecting past another side edge of the roofing panel; and wherein the second plurality of panels includes a series of photovoltaic modules, each photovoltaic module comprising: a core; a waterproofing layer positioned in an offset alignment with respect to the core so as to define at least one inset portion along at least one side edge of the photovoltaic module and at least one flange portion projecting past another side edge of the photovoltaic module; and a photovoltaic cell positioned along the exterior facing surface of the waterproofing layer; positioning a next panel of the first or second pluralities of panels adjacent the installed panel, with a side edge of the core of the next panel in a substantially side-by-side abutment with an adjacent side edge of the installed panel, and with a flange portion of the waterproofing layer of the installed or next panel overlapping a corresponding inset portion of the installed or next panel; engaging and securing the overlapping flange portions of the waterproofing layer of the installed or next panel along the corresponding inset portions of the installed or next panel to couple the installed and next panels together; and securing the coupled panels to the rafters.

In embodiments, each of the photovoltaic modules further comprises an inverter coupled to the photovoltaic cell, the inverter located below the exterior facing surface of the core; and having at least on connector extending below an interior facing surface of the photovoltaic module. In embodiments of the method, securing the coupled panels to the rafters comprises inserting fasteners through the overlapping flange and inset portions of the installed and next panels.

In some embodiments of the method, the waterproofing layer comprises a polymer material; and engaging and securing the overlapping flange portion of the waterproofing layer along the corresponding inset portion comprise adhering the flange portion of the waterproofing layer to the corresponding inset portion by an adhesive applied to the waterproofing layer, or by heat sealing of the waterproofing layers of the installed and next panels.

According to another aspect, a roofing system is provided, comprising a plurality of panels configured to extend across a span between a series of adjacent rafters of a roof; wherein the panels include a series of solar panels, each solar module comprising: a core having side edges; and a waterproofing layer applied over the core in an offset alignment so as to define flanges projecting past side edges of the core and inset portions opposite the flanges; wherein the flanges of the waterproofing layer are configured to overlap with corresponding inset portions of adjacent solar panels connected in series across the span between adjacent rafters; and a photovoltaic cell positioned along the core, wherein the photovoltaic cell is insulated from the at least one covering layer.

In embodiments, at least some of the solar panels further comprise an inverter coupled to the photovoltaic cell, the inverter received within the core. In embodiments of the roofing system the plurality of panels further comprises non-functional panels having a configuration that substantially matches the solar panels.

In embodiments of the roofing system, wherein the core comprises a foam and the solar panels further comprise at least one covering layer comprising a metal or polymer sheet adhered to interior and exterior facing surfaces of the core.

In some embodiments the metal or polymer sheets of the at least one covering layer are positioned in an offset alignment over the exterior and interior facing surfaces of the core so as to define inset portions along adjacent side edges of the core and the at least two flanges, and wherein the at least two flanges project past adjacent side edges of the core opposite the inset portions.

In some embodiments of the roofing system the plurality of panels further comprises a series of roofing panels, each roofing panel including a core having side edges; and a waterproofing layer applied over the at least one covering layer in an opposite and diagonally offset alignment so as to define an inset area along at least one of the side edges of the core of the roofing panel and a flange portion projecting past at least one of the side edges of the core of the roofing panel opposite and diagonally offset from the inset portions; wherein the flange portion of the waterproofing layer is configured to engage a corresponding inset area of an adjacent roofing panel or solar module.

In embodiments of the roofing system, each roofing panel and each solar panel further include at least one covering layer applied over exterior and interior facing surfaces of the core; and wherein the at least one covering layer of at least some of the solar panels and roofing panels each comprise a metal or polymer sheet having a plurality of gripping features arranged therealong and configured to engage and grip the cores of adjacent roofing panels or solar panels to inter-lock the solar panels and/or roofing panels in series.

In some embodiments, the solar panels further comprise a layer of an insulating material applied between the photovoltaic cell and at least one covering layer positioned over an exterior facing surface of the core.

According to another aspect, a method of forming a roof is provided, comprising installing a panel of a plurality of panels in a position spanning a pair of spaced rafters; wherein the panels include a series of solar modules, each solar module comprising a core having side edges, a waterproofing layer applied over at least the core in an offset alignment so as to define at least one flange projecting past one or more of the side edges of the core and at least one inset portion opposite the at least one flange, and a photovoltaic cell positioned along the core; and positioning a next panel of the plurality of panels adjacent the installed panel, with one of the side edges of the core of the next panel in a substantially side-by-side abutment with an adjacent one of the side edges of the installed panel, and with the at least one flange of the installed panel or the next panel overlapping the corresponding at least one inset portion of the next panel or the installed panel.

In embodiments, the method further comprises engaging and securing the at least one flange of the installed panel or the next panel along the corresponding at least one inset portion of the next panel or the installed panel to couple the installed and next panels together.

In embodiments of the method, the plurality of panels further comprises a plurality of roofing panels, each roofing panel comprising a core, and a waterproofing layer positioned over the core in an offset alignment with respect to the core so as to define at least one inset portion along at least one side edge of the roofing panel and at least one flange portion projecting past another side edge of the roofing panel; and wherein positioning the next panel of the plurality of panels adjacent the installed panel comprises placing at least one of a roofing panel or solar panel in a substantially side-by-side abutment with an adjacent side edge of the installed panel, and with a flange portion of the waterproofing layer of the installed panel or the roofing panel or solar panel overlapping a corresponding inset portion of the roofing panel or solar panel or the installed panel.

In some embodiments, the waterproofing layer comprises a polymer material; and the method further comprises engaging and securing the overlapping flange portion of the waterproofing layer along the corresponding inset portion comprise adhering the flange portion of the waterproofing layer to the corresponding inset portion by an adhesive applied to the waterproofing layer, by inserting fasteners through the overlapping flange and inset portions of the installed and next panels, by heat sealing of the waterproofing layers of the installed and next panels, or by a combination thereof.

These and other aspects, features and components of the apparatus and methods of forming interlocking structural roofing panels with integrated solar roofing panels, and embodiments thereof, according to the principles of the present disclosure, will be better understood upon review of the detailed description set forth below, taken in conjunction with the accompanying drawing figures, which are briefly described as follows.

DETAILED DESCRIPTION

The embodiments of the present disclosure will now be described in more detail with reference to the attached drawing figures. In embodiments, a roofing system is provided wherein roofing panels are assembled to or installed on or over rafters and/or other supports to form a roof. Moreover, the accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

Figure 1:
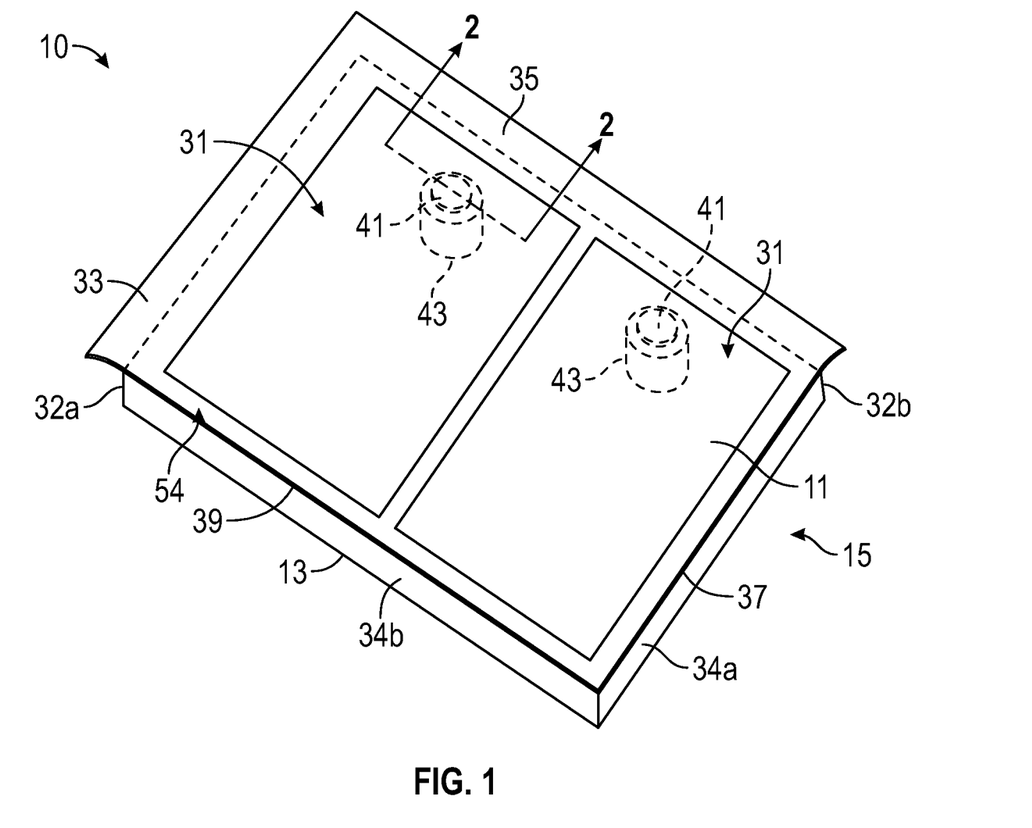
FIG. 1 is a top perspective view of a structural panel according to an embodiment of the disclosure.
Figure 3:
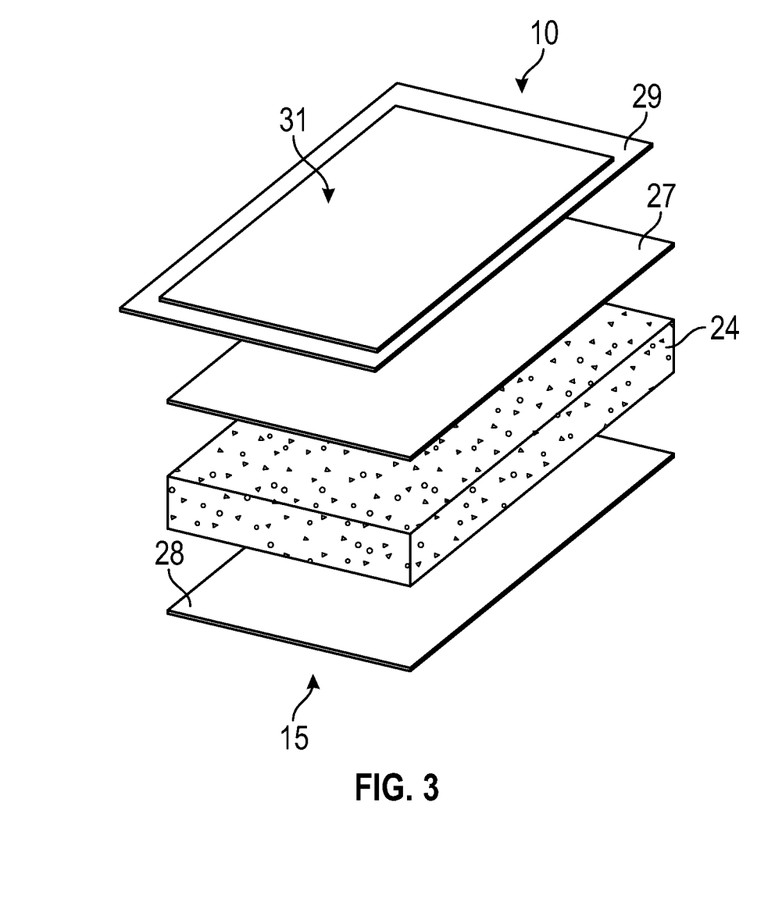
FIG. 3 is a schematic view of exemplary layers of the structural panel of FIG. 1 according to an embodiment of the disclosure.
Figure 4:
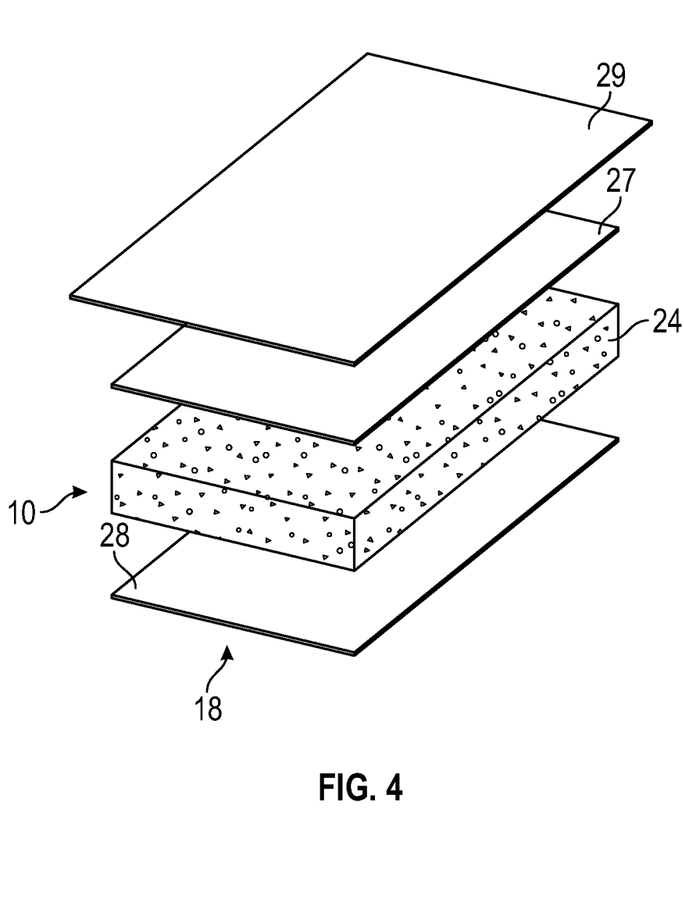
FIG. 4 is a schematic view of different exemplary layers of a structural panel according to an embodiment of the disclosure.
Figure 5:
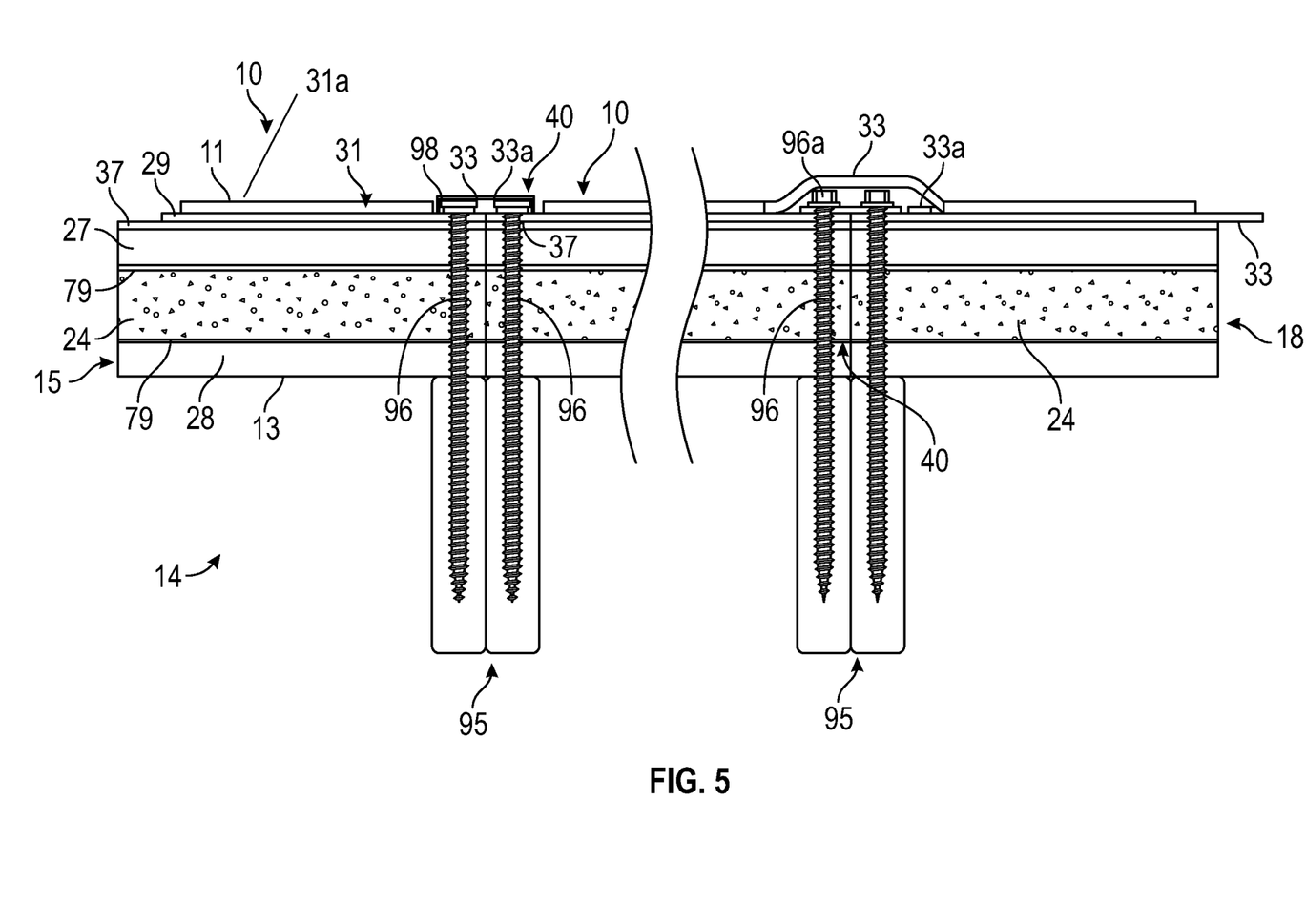
FIG. 5 is a schematic elevation view showing an interconnection of structural panels according to an embodiment of the disclosure.

In the present disclosure, FIGS. 1-6 illustrate embodiments of a roofing system is formed using interlocking structural panels. FIG. 1, in one embodiment, schematically illustrates a structural panel 10 for the roofing system is shown, including an outer, exterior side surface 11 adapted to be exposed to weather, and an inner side 13 that faces the interior of a structure when installed. The structural panel 10 can be manufactured in varying sizes according to specifications for a roofing structure or installation in which the structural panels will be used. The structural panels 10 will be configured to act as a structural component for construction of a roofing system or roof structure 14 as shown in FIG. 5, and further can be adapted and/or constructed to be easily handled and installed by individual installers.

In the embodiment shown in FIGS. 1 and 3, the structural panel 10 is shown as comprising a photovoltaic module or solar panel 15 for the roofing system, which can include photovoltaic cells 31. Alternatively, the photovoltaic cells 31 could be omitted to form a structural roofing panel 18 (FIG. 4) for the roofing system. In exemplary embodiments such as indicated in FIG. 5, the roofing system or roof structure 14 can include a first plurality of structural panels 10 in the form of roofing panels 18 and a second plurality of structural panels in the form of photovoltaic modules or solar panels 15 (FIG. 3), wherein the photovoltaic modules or solar panels 15 can be mounted in series with the roofing panels 18 to form the roof system or roof structure 14.

As schematically shown in FIG. 3, in embodiments, the structural panel's 10 can have a laminated or layered structure with a lightweight foam core 24 sandwiched between outer and inner layers of other materials. For example, the core 24 can be formed from a lightweight structural foam material, such as a polyisocyanurate (ISO), polystyrene, PVC, polyethylene, polyamide, a phenolic material, or other foam material providing sufficient rigidity and strength to the roofing panels and solar panels 15 or photovoltaic modules as needed to form the roof structure 14, while enabling ease of handling and installation, and can have a sheet or layer of paper or other material applied thereover. In some embodiments, the core 24 can be between 1 inch to 4 inches in thickness, and in other embodiments can have a thickness of 1 inch to 3.5 inches, 1 inch to 3 inches, 1 inch to 2.5 inches, 1 inch to 2 inches, 1 inch to 1.5 inches, 1.5 inches to 4 inches, 1.5 inches to 3.5 inches, 1.5 inches to 2.5 inches, 1.5 inches to 2 inches, 2 inches to 4 inches, 2 inches to 3.5 inches, 2 inches to 3 inches, 2 inches to 2.5 inches, 2.5 inches to 4 inches, 2.5 inches to 3.5 inches, 2.5 inches to 3 inches, 3 inches to 4 inches, 3 inches to 3.5 inches, or 3.5 inches to 4 inches. Various other thicknesses of the core 24 also can be used As further shown in FIG. 3, at least one upper covering layer 27 (e.g., a sheet or panel of finished plywood or veneer, a metal sheet, a polymer sheet, or any other suitable material) can be positioned over the core 24; and a waterproofing layer 29 (e.g., a polymer membrane such as a thermoplastic polyolefin (TPO) sheeting, or other suitable waterproof covering material) will be positioned over the at least one upper covering layer 27.

In some embodiments, the upper covering layer 27 can be adhered to an outward-facing surface or exterior facing surface of the core 24, or could be mounted on, secured to, or coupled to the core 24 by adhesives or any other suitable connections. For example, the upper covering layer 27 can include a wood or polymer material with an adhesive material, paper or other material sheet applied thereto, and can act as an insulating and/or fire-proofing layer. Similarly, the waterproofing layer 29 can be adhered to an outward-facing surface or exterior facing surface of the upper covering layer 27 or could be mounted on, secured to, or coupled to the upper covering layer 27 by any suitable features. The waterproofing layer 29, in addition to the blocking passage of water, also can act as an insulating layer.

As FIG. 3 also illustrates, in some configurations, the structural panels 10 can include a lower covering layer 28, such as a polymer or wood sheet, a metal sheet, or any other suitable material, that can be applied to the interior facing surface of the core 24. For example, the lower covering layer 28 can be applied to the core 24 to form a finished interior ceiling, or to facilitate hanging additional layers therefrom to form the interior ceiling after the structural panels 10 are installed as part of a roof. In other embodiments, the lower covering layer 28 could be omitted.

Figure 6:
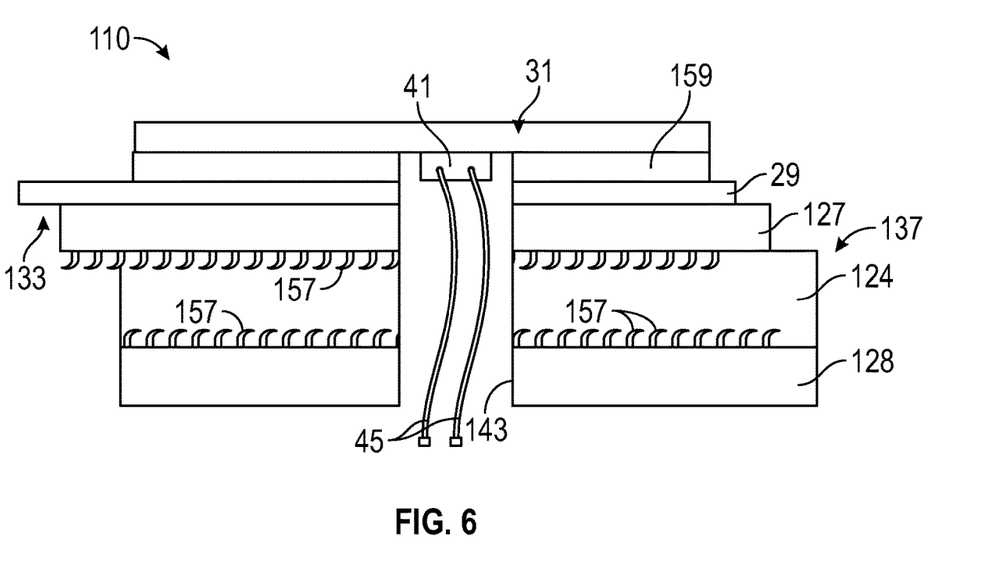
FIG. 6 is a schematic cross-sectional view of layers of a structural panel according to an alternative embodiment of the disclosure.

The covering layers 27, 28 further generally can be secured to the core 24 by adhesive materials/layers 79, shown schematically in FIG. 5, and can include a fireproofing sheeting/layer, paper or other materials applied to their surfaces. However, in some embodiments, the covering layers 27, 28 can include metal or polymer sheets having other attachment features for mounting the covering layers to the surfaces of the core, such as fasteners, hooks, etc., as shown in FIG. 6.

The covering layers 27, 28 further can vary in thickness; for example, the covering layers can be ¾ inch to ¼ inch, ¾ inch to ½ inch, ¾ inch to ⅜ inch, ½ inch to ⅜ inch, ½ inch to ¼ inch, and/or ¼ to ⅜ inch. Other thicknesses also can be used.

As shown in FIG. 1, the waterproofing layer 29 will be positioned in an offset alignment, with two flanges or overlapping portions 33, 35 defined along two side edges 32a, 32b of the structural panel 10, and with one or more inset or recessed portions 37, 39 along respective side edges 34a, 34b at the structural panel opposite to the respective flanges 33, 35. In the illustrated embodiment, the flanges 33, 35 project past the side edges 32a, 32b of the structural panel 10 and over the recessed portions 37, 39 can be defined along the side edges 34a, 34b of the structural panel 10. The flanges 33, 35 can be overlapped over the respective recessed portions 37, 39 of adjacent structural panels 10 at an area of interconnection 40, and, in some embodiments, can be trimmed to generally match and abut with a trailing or distal edge 33a of the waterproofing layer of the adjacent installed structural panel, when the structural panels 10 are assembled to form the roof system or roof structure 14 (e.g., as schematically shown in FIG. 5). Alternatively, one of the flange portions 33 of one of the structural panels 10 can be overlapped over the abutting side edge of its adjacent interconnected structural panel so as to at least partially cover or overlap the distal or trailing edge 33a of the waterproofing layer of the adjacent structural panel 10.

In exemplary embodiments, the flanges 33, 35 (FIG. 1) can be adhesively attached or connected to the respective recessed portions 37, 39 of an adjacent structural panel 10 at the area of interconnection 40 as indicated in FIG. 5. For example, in some embodiments, the undersides of the flanges 33, 35 (FIG. 1) can be provided with an adhesive, that can be applied in the field or can include a peel-and-stick type adhesive having a removable covering that can be peeled away to expose the adhesive so that the adhesive at least partially secures the undersurfaces of the flanges 33, 35 to the upper surfaces of the respective recessed portions 37, 39 of adjacent structural panels 10 when the flanges 33, 35 overlap and engage the recessed portions 37, 39. Alternatively, or in addition, the peel-and-stick adhesive or other adhesive could be applied to an upper surface of the recessed portions 37, 39 for adhering the upper surfaces of the recessed portions 37, 39 to the undersurfaces of the respective flanges 33, 35 of adjacent structural panels 10. In still further embodiments, the overlapping portions of the waterproofing layers 29 of the adjacent structural panels 10 can be heat sealed to attach the waterproofing layers together and seal the seam between the adjacent installed structural panels 10.

As schematically shown in FIG. 5, the structural panels 10 (including a photovoltaic module or solar panel 15 and a roofing panel 18) further can be secured together by fasteners 96 (e.g., nails, screws, bolts, etc.) that can be applied along seams defined between the adjacent structural panels 10, where the flanges 33 of one structural panel overlap the adjacent structural panel, to secure the structural panels 10 together and to the rafters 95 of the roof structure 14. For example, at least one of the fasteners 96 can extend through the flange 33 of one structural panel 10 and through at least the upper covering layer 27, the core 24, and the lower covering layer 28 of an adjacent structural panel 10, and then into the roof rafters 95. Accordingly, the structural panels 10 are configured to interconnect or otherwise engage in a manner that provides ease of installation while also providing substantial structural integrity and strength to the structural panels 10 so that the structural panels 10 can support their own weight when spanned across and attached to widely spaced roof rafters 95.

Figure 2:
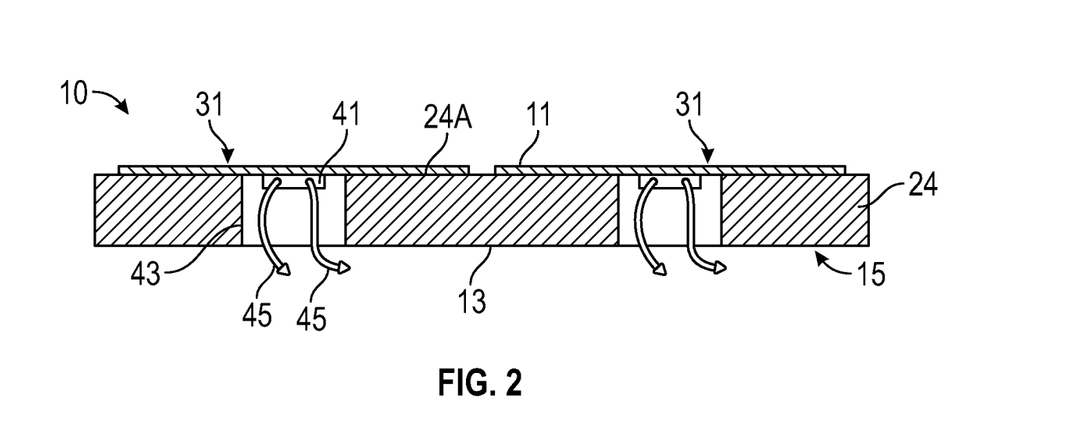
FIG. 2 is a partial cross-sectional view of a portion of the structural panel of FIG. 1 taken along line 2-2.

In the illustrated embodiment of FIG. 1, the structural panels 10 are shown configured as photovoltaic modules or solar panels 15, which further can include one or more photovoltaic cells 31 received along an exterior facing surface of the waterproofing layer 29 of the structural panel 10 (FIGS. 1-3), and generally covered with a glass or clear protective layer 31a. For example, FIGS. 1 and 2 illustrate embodiments of structural panels 10 with multiple photovoltaic cells 31, while FIG. 3 shows a single photovoltaic cell. Other configurations of structural panels 10 with photovoltaic cells 31 also can be provided.

In exemplary embodiments, the photovoltaic cell 31 can be adhered to the waterproofing layer 29 or could be mounted over and secured to, or coupled to the waterproofing layer 29 by any suitable method. As further shown in FIGS. 1 and 2, an inverter or micro-inverter 41 can be coupled to the photovoltaic cell 31, and can be received below an upper surface 24A of the core, being mounted in a chamber 43 below the upper surface 24A of the core 24, and can be accessible from inside the roof structure. While the inverter 41 and chamber 43 are shown in FIG. 1 for illustration purposes, the chamber 43 and the inverter 41 generally will be hidden from the exterior side surface 11 by at least one of the upper covering layer 27, the waterproofing layer 29, and the photovoltaic cell 31.

Cables or other connectors 45 further can extend from the inverter 41 and from the photovoltaic cell 31 through the core 24 of the structural panel 10 to the inner side 13 of the structural panel 10 (e.g., to the interior facing surface of the core 24), enabling access from within the structure, below the roof. In some embodiments, an insulating layer further can be applied between the photovoltaic cell 31 and the upper covering layer 27 (e.g., between the photovoltaic cell 31 and the waterproofing layer 29 and/or between the waterproofing layer 29 and the upper covering layer 27) to help further insulate the photovoltaic cell 31 from other layers or portions of the structural panel 10 or from flashing, etc. . . . .

For the structural panels 10 in the form of roofing panels 18 (e.g., non-functioning panels), the inverter 41, chamber 43, and cables 45 can be omitted from the core 24, and the photovoltaic cell 31 can be omitted from the exterior side of the waterproofing layer 29 (e.g., as schematically shown in FIG. 4). Accordingly, the waterproofing layer 29 can extend along the exterior side surface 11 of the roofing panel.

In an exemplary embodiment, the structural panels 10 (e.g., in the form of photovoltaic modules, roofing panels, or a combination thereof) can be assembled to form a roof structure 14. For example, as shown in FIG. 5, a first structural panel 10 can be installed in a position spanning a pair of spaced rafters of the roof structure 14, and a second structural panel 10 can be positioned adjacent the installed structural panel 10 with a side edge 32a of the core 24 of the next/adjacent structural panel 10 in a substantially side-by-side abutment with an adjacent side edge 34a of the installed panel (e.g., as schematically shown in FIG. 5). A flange portion 33 of the waterproofing layer 29 of one of the structural panels 10 will overlap a corresponding inset portion 37 of another, adjacent structural panel 10 at an area of interconnection 40. In the illustrated embodiment, the flange 33 of one structural panel can engage and be secured to the inset or recessed portion 37 of the adjacent panel to couple the panels together and the coupled panels can be secured to the rafters 95.

FIG. 5 is a side view showing an example of how the structural panels 10 of the present disclosure may be attached to underlying rafters. The rafters 95, which in this example are double rafters, underlie the seams or areas of interconnection 40 between adjacent structural panels 10. Fasteners 96 such as nails (on the left) or screws (on the right) are driven through adjacent panels adjacent their seams. More specifically, one or both of the fasteners 96 can extend through at least one of the structural panels along or adjacent the interlocking features and the seam 40 formed by overlapping projecting flanges 33 and offsets 37. As a result, the adjacent structural panels 10 are interlocked securely together by the fasteners 96 that extend through these features and into the underlying roof rafters 95. As also shown in FIG. 5, a cover or cover strip 98 further can be installed over the heads 96a of the fasteners 96 to help prevent leaks at their puncture locations.

Alternatively, as also shown in FIG. 5, the flanges 33 can extend over and cover the heads 96a of the fasteners 96, sealing the seam between the adjacent structural panels 10, and can be adhesively attached or otherwise attached, such as by heat sealing the flanges of the waterproofing layers. In some embodiments, the overlapping flange 33 of one of the adjacent panels can be trimmed such that its edge can be substantially matched with and attached to a distal or trailing edge 33a of the installed, adjacent structural panel 10, such as by adhesives, heat sealing, etc. As also indicated in FIG. 5, the flange 33 of one structural panel 10 can be overlapped over the fasteners 96 and the distal or trailing edge 33a of the adjacent structural panel and adhesively attached or heat sealed to or along the distal edge of the adjacent structural panel 10 to couple the structural panels 10 together in series along the roof structure 14.

In addition, in some embodiments, the heads 96a of the fasteners 96 can be countersunk into the exterior side surfaces 11 of the structural panels 10, for example, being countersunk or recessed into the upper covering layers 27 of adjacent structural panels. In embodiments, such as where a covering layer is not utilized, the heads of the fasteners also can be countersunk or recessed into the core. With the heads of the fasteners countersunk into the upper covering layers and/or the cores of the structural panels, the flanges 33 of the waterproofing layers 29 overlapping the joints or seams between adjacent structural panels can lay substantially flat over the heads of the fasteners and the exterior side surfaces of the structural panels.

In another alternative embodiment, one or more layers of the structural panel 10 could include self-gripping sheets with gripping hooks that can be used to secure the self-gripping sheet to another layer. In some embodiments, the gripping hooks can secure the layers together in conjunction with adhesive, fasteners, etc. Self-gripping metal sheets are thin gauge sheet metal with thousands of mechanically extruded or gouged-out hooks on one or both of its surfaces. When pressed onto a material such as wood, the hooks penetrate and grip the wood to secure the Grip Metal sheet to the wood. The Grip Metal sheet thus becomes firmly bonded to the wood or other material to form an integrated metal surface. An example of self-gripping metal are products available from the Trip Metal Corporation of Wolcott, Connecticut marked under the brand name Grip Metal®.

For example, as schematically shown in FIG. 6, a structural panel (e.g., in the form of a photovoltaic module) can have a core 124 with self-gripping covering layers 127, 128, which can include self-gripping metal or polymer sheets or layers engaging and mounted to one or both of surfaces of the core with gripping hooks 157, which can be arranged along peripheral portions thereof, and with adhesive layers 159 along the opposite sides thereof. The self-gripping covering layers 127, 128 can be pressed onto the core 124 such that the hooks 157 penetrate, grip, and bond to the core 124. In addition, at least the upper gripping covering layer 127 can be offset from the core 124 and/or other layers to form a projection 133 with the gripping hooks 157 extending from the undersurface of the projection 133, and which projection can engage and grip a corresponding recessed portion 137 of an adjacent structural panel 110.

Alternatively, an intermediate layer can be applied between the self-gripping covering layers 127, 128 and the core 124, which intermediate layers can include wood, polymer or other material sheets or layers that can be adhesively attached to the core along inner facing surfaces thereof, and with their outer facing surfaces being engaged by the gripping hooks. The waterproofing layer 29 will be applied over the opposite, outer facing surface of the upper gripping covering layer 127. Still further, the self-gripping covering layers 127, 128 can be oriented with their inner-facing surfaces adhesively applied to the core 124, and the gripping hooks of the self-gripping covering layers 127, 128 positioned along the upper/exterior facing sides of the self-gripping covering layers 127, 128, and with an upper layer or sheet of a wood or polymer material applied thereover and engaged by the gripping hooks. The waterproofing layer further can be attached to an exterior facing surface of the upper layer or sheet by adhesives, fasteners, heat sealing, etc. . . . . .

The self-gripping covering layers 127, 128 also can vary in thickness, for example, in embodiments, the covering layers can be ¾ inch to ¼ inch, ¾ inch to ⅜ inch, ½ inch to ¾ inch, ½ inch to ⅜ inch, ½ inch to ¼ inch, and/or ¼ inch to ⅜ inch. Other thicknesses and configurations also can be used. In some embodiments, the core 124 can be between 1 inch to 4 inches in thickness, and in other embodiments can have a thickness of 1 inch to 3.5 inches, 1 inch to 3 inches, 1 inch to 2.5 inches, 1 inch to 2 inches, 1 inch to 1.5 inches, 1.5 inches to 4 inches, 1.5 inches to 3.5 inches, 1.5 inches to 2.5 inches, 1.5 inches to 2 inches, 2 inches to 4 inches, 2 inches to 3.5 inches, 2 inches to 3 inches, 2 inches to 2.5 inches, 2.5 inches to 4 inches, 2.5 inches to 3.5 inches, 2.5 inches to 3 inches, 3 inches to 4 inches, 3 inches to 3.5 inches, or 3.5 inches to 4 inches. Various other thicknesses of the core 124 also can be used.

As also schematically shown in FIG. 6, the waterproofing layer 29 can be further offset from the upper gripping covering layer 127 such that the flange portions of the waterproof layers overlap corresponding inset areas of adjacent structural panels, covering a seam or area of interconnection between the structural panels and being secured with adhesives, fasteners or other attachments. For structural panels formed as a photovoltaic module or solar panel, one or more photovoltaic cells 31 can be mounted along the structural panel, the photovoltaic cell being received over the waterproofing layer 29. An insulating layer also can be provided to help insulate the photovoltaic cell and/or its inverter/micro-inverter from a grip metal covering layer, or from flashing or other metal materials as needed. In addition, the waterproofing layer also can act as an insulating layer.

When two structural panels such as shown in FIG. 6 are abutted sided-by-side and pressed together along the resulting seam, the gripping hooks 157 of a projection 133 of a first structural panel can be embedded with an adjacent structural panel 110 along a recessed portion 137 thereof, and with the flange portion of the waterproofing layer of the first structural panel further overlapping and being attached to the adjacent structural panels along a corresponding inset area thereof. This securely interlocks the two adjacent panels together along their seam to form a single monolithic and very strong structure. Additionally, fasteners 96 can be installed at the seam as described above so that not only are the panels interlocked securely together by means of the interlocking hooks of the interlocking features, they are further secured by the fasteners that extend through these features and into underlying roof rafters. The result is an integrated roof covering configured to provide structural integrity while comprising lightweight panels that can be installed easily by a small installation crew or a single installer.

Any of the features of the various embodiments of the disclosure can be combined with replaced by, or otherwise configured with other features of other embodiments of the disclosure without departing from the scope of this disclosure. The configurations and combinations of features described above and shown in the figures are included by way of example.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A roofing system, comprising:
a plurality of panels configured to extend across a span between a series of adjacent rafters of a roof;
wherein at least a portion of the plurality of panels include solar panels, each solar panel comprising:
a plurality of side edges;
a core; and
a waterproofing layer applied over an upper surface of the core in an offset alignment so as to define at least two flanges projecting past at least two of the side edges of the solar panel and trailing edges spaced inwardly from at least two other side edges of the solar panel so as to define at least one inset portion along the upper surface of the core opposite each of the at least two flanges;
wherein each of the at least two flanges of the waterproofing layer is configured to lay substantially flat against a corresponding inset portion of an adjacent solar panel connected in series across the span between the adjacent rafters with a leading edge of each of the at least two flanges abutting a trailing edge of a waterproofing layer of the adjacent solar panel; and
at least one photovoltaic cell positioned along the core.

2. The roofing system of claim 1, wherein at least some of the solar panels further include an inverter coupled to the at least one photovoltaic cell, the inverter at least partially received in a chamber formed along the core.

3. The roofing system of claim 1, wherein each of the solar panels further comprises at least one covering layer positioned over the core, wherein the waterproofing layer is positioned over the at least one covering layer.

4. The roofing system of claim 1, wherein each of the solar panels further comprises at least one covering layer positioned over the core, and wherein the at least one photovoltaic cell is insulated from the at least one covering layer of each of the solar panels by the waterproofing layer.

5. The roofing system of claim 1, wherein the plurality of panels further comprises non-functional panels having a configuration that substantially matches a configuration of the solar panels.

6. The roofing system of claim 1, wherein the core comprises a foam, and further comprising a covering layer including at least one metal or polymer sheet positioned in an offset alignment over the core so as to define the inset portions along adjacent side edges of each solar panel, and define the at least two flanges, wherein the at least two flanges project past adjacent side edges of the solar panel opposite the inset portions.

7. The roofing system of claim 6, wherein the at least one metal or polymer sheet of the covering layer further includes a plurality of gripping features arranged therealong and configured to engage and grip the cores of adjacent roofing panels or solar panels to inter-lock adjacent solar panels and/or roofing panels in series.

8. The roofing system of claim 1, wherein the plurality of panels further comprise a series of roofing panels, each roofing panel including:
a plurality of side edges;
a core;
a waterproofing layer applied over an upper surface of the core in an opposite and diagonally offset alignment, the waterproofing layer having trailing edges spaced inwardly from at least two of the side edges of the roofing panel so as to define an inset area located along the upper surface of the core and along the at least two of the side edges of the roofing panel and a flange portion projecting past the at least two of the side edges of the roofing panel opposite and diagonally offset from the inset portions;
wherein the flange portion of the waterproofing layer is configured to engage and lie substantially flat against a corresponding inset area of an adjacent roofing panel or solar panel, with a leading edge of the waterproofing layer abutting a trailing edge of a waterproofing layer of the adjacent roofing panel or solar panel.

9. The roofing system of claim 1, further comprising a layer of an insulating material applied between the photovoltaic cell and at least one covering layer and the core of each solar panel.

10. A roofing system, comprising:
a first plurality of panels configured to inter-connect on a roof, and a second plurality of panels configured to inter-connect on the roof;
wherein the first plurality of panels comprises roofing panels, each roofing panel including:
a plurality of side edges;
a core; and
a waterproofing layer positioned over the core;
wherein the waterproofing layer is positioned over an upper surface of the core in an offset alignment with respect to the core, the waterproofing layer having trailing edges spaced inwardly from at least two side edges of the core so as to define an inset portion located along the upper surface of the core and along the at least two side edges of the roofing panel and at least one flange portion projecting past two other side edges of the roofing panel opposite the inset portions; and
wherein the second plurality of panels comprise photovoltaic modules, each photovoltaic module including:
a core having an exterior facing surface, an interior facing surface, and side edges;
a waterproofing layer positioned over an upper surface of the core in an offset alignment with respect to the core, the waterproofing layer having trailing edges spaced inwardly from at least two side edges of the core so as to define an inset portion located along the upper surface of the core and along the at least two side edges of the photovoltaic module, and at least one flange portion projecting past two other side edges of the photovoltaic module opposite the inset portions; and
a photovoltaic cell positioned along the exterior facing surface of the waterproofing layer;
wherein when the roofing panels of the first plurality of panels and the photovoltaic modules of the second plurality of panels are located along a span between rafters of the roof, with at least one of the flange portions of one of the waterproofing layers of each roofing panel or photovoltaic module laying substantially flat against a corresponding inset portion of an adjacent roofing panel or photovoltaic module and with a leading edge of the waterproofing layer of each roofing panel or photovoltaic module abutting a trailing edge of a waterproofing layer of the corresponding inset portion of the adjacent roofing panel or photovoltaic module.

11. The roofing system of claim 10, wherein each of the photovoltaic modules further includes an inverter coupled to the photovoltaic cell, the inverter being at least partially received in a chamber formed along the core.

12. The roofing system of claim 10, wherein each of the photovoltaic modules further includes at least one covering layer positioned over the core thereof, wherein the waterproofing layer of each photovoltaic module is positioned over the at least one covering layer; and wherein each of the roofing panels further includes at least one covering layer positioned over the core thereof, and wherein the waterproofing layer of each roofing panel is positioned over the at least one covering layer.

13. The roofing system of claim 10, wherein the waterproofing layers of the photovoltaic modules and the roofing panels comprise a polymer membrane having at least one overlapping edge portion configured to extend past at least one side edge of each of the photovoltaic modules and roofing panels sufficient to cover an area of interconnection between adjacent photovoltaic modules.

14. The roofing system of claim 13, wherein the polymer membrane of the waterproofing layers comprises a thermoplastic polyolefin sheeting with an adhesive applied along a backing surface thereof.

15. The roofing system of claim 10, wherein the second plurality of panels further comprises a series of non-functional panels each having a configuration that substantially matches a configuration of the photovoltaic modules.

16. The roofing system of claim 10, wherein the core of each of the roofing panels and the photovoltaic modules comprises polyisocyanurate (ISO), polystyrene, PVC, polyethylene, polyamide, or a phenolic material.

17. The roofing system of claim 10, further comprising covering layers arranged over first and second surfaces of the cores of the roofing panels and over the exterior and interior facing surfaces of the cores of the photovoltaic modules so as to be diagonally offset in a first direction and a second direction, defining flange portions extending past a pair of adjacent side edges of the roofing panels and the photovoltaic modules.

* * * * *